United States Patent [19]
Kost et al.

[11] Patent Number: 5,480,219
[45] Date of Patent: Jan. 2, 1996

[54] CONTROL OF VEHICLE SIDE SLIP USING YAW RATE

[75] Inventors: Friedrich Kost, Kornwestheim; Wolf-Dieter Ruf, Waldstetten; Uwe Hartmann, Stuttgart; Thomas Ehret, Seelbach; Anton Van Zanten, Ditzingen; Rainer Erhardt, Stuttgart, all of Germany

[73] Assignee: Robert Bosch GmbH, Stuttgart, Germany

[21] Appl. No.: 290,885

[22] PCT Filed: Dec. 4, 1993

[86] PCT No.: PCT/DE93/01156

§ 371 Date: Aug. 18, 1994

§ 102(e) Date: Aug. 18, 1994

[87] PCT Pub. No.: WO94/14640

PCT Pub. Date: Jul. 7, 1994

[30] Foreign Application Priority Data

Dec. 23, 1992 [DE] Germany .......................... 42 43 717.2

[51] Int. Cl.[6] .............................. B60K 28/16; B60T 8/32; B60T 8/24

[52] U.S. Cl. .............................................. 303/146; 303/191

[58] Field of Search ...................... 303/100, 102, 303/103, 105, 106, 110; 180/197; 364/426.02

[56] References Cited

U.S. PATENT DOCUMENTS

| | | | |
|---|---|---|---|
| 4,898,431 | 2/1990 | Karnopp et al. | 303/100 |
| 4,939,656 | 7/1990 | Hoashi et al. | 303/97 X |
| 5,275,475 | 1/1994 | Hartmann et al. | 303/103 |
| 5,332,300 | 7/1994 | Hartmann et al. | 303/100 |

FOREIGN PATENT DOCUMENTS

| | | |
|---|---|---|
| 4030704 | 9/1990 | Germany . |
| 4229504 | 9/1992 | Germany . |

OTHER PUBLICATIONS

Zomotor, Adam: Fahrwerktechnik: Fahrverhalten pp. 112–116 (1987).
Bosch Automotive Handbook pp. 340–347 (1993).

*Primary Examiner*—Josie A. Ballato
*Attorney, Agent, or Firm*—Felfe & Lynch

[57] ABSTRACT

A required yaw rate value is determined based on driver inputs such as steering angle, master cylinder pressure, and throttle butterfly angle. The required yaw rate is compared to a measured actual yaw rate value and the actual yaw moment acceleration is influenced based on the comparison.

9 Claims, 1 Drawing Sheet

CONTROL OF VEHICLE SIDE SLIP USING YAW RATE

PRIOR ART

The invention relates to a method of controlling vehicle stability by determining a required yaw velocity $\omega_{soll}$ based on a steady state required yaw rate $\omega_{soll0}$. A method for determining $\omega_{soll0}$ is disclosed in DE 42 29 504, to which U.S. Ser. No. 08/090,837 corresponds. The subject matter of the latter is based on DE 37 31 756, to which U.S. Pat. No. 5,332,300 corresponds.

SUMMARY OF THE INVENTION

The wish of the driver for a change of direction, as well as that for vehicle acceleration or deceleration, is taken into account and weighted. The required value is calculated in such a way that the vehicle reacts rapidly to steering angle changes and then maintains a stable condition which depends on the adhesion coefficient of the road and in which the sideslip angle does not increase further.

The following advantages are achieved by the invention and by the further developments in accordance with the preferred embodiments:

The driver's wish is taken into account in the distribution, of the total available tire force, between longitudinal force and transverse force using $v_F$, $\delta$, $P_{vor}$, $F_{ges}$;

Calculation of a limit, to ensure vehicle stability, for the required yaw rate with $a_Q$ and $v_F$;

Filtering the required yaw rate value for matching to the vehicle's intrinsic dynamics of motion or to change in the vehicle dynamics of motion;

Supporting the incidence motion of the vehicle when the steering angle is increased in order to build up side force more rapidly.

In systems for controlling the dynamics of vehicle motion in order to improve the controllability of the vehicle, it is necessary to fix the parameters to be controlled and then to determine suitable required values for these parameters.

If the vehicle motion is considered in one plane (roadway) and not in three dimensions, the vehicle then has three degrees of freedom, namely longitudinal velocity and transverse velocity and the rotational velocity about the vertical axis (yaw rate). The yaw rate has been found to be a particularly suitable control parameter because it can be measured directly by means of sensors and can be effectively controlled by changing the wheel slip values or the slip angle and, therefore, by the application of yaw moments. The transverse velocity of the vehicle cannot be measured accurately. It can, however, be estimated by a control algorithm (observer) when the yaw rate is known.

The following computational operations are carried out to calculate the required yaw rate value $\omega_{soll}$:

A steady-state required yaw rate, which depends on the steering angle $\delta$ and on the vehicle longitudinal velocity $v_F$, is calculated first.

$$\omega_{soll0} = k \frac{v_F}{L(1 + v_F^2/v_{ch}^2)} \times \delta$$

In this, $v_{ch}$ is the characteristic vehicle speed with which the amount of the understeer tendency can be fixed, also if need be as a function of the driving condition (driven, freely rolling, braked).

In the case of steady-state travel in a circle, a desired side force $F_{S,W}$ can now be calculated from the required steady state yaw rate:

$$F_{S,W} = m \cdot v_F \cdot \omega_{soll0}$$

with the vehicle mass m

The desired longitudinal force $F_{L,W}$ can be calculated, depending on the accelerator pedal position or brake pedal position, from the measured quantities of admission (master cylinder) pressure $P_{vor}$ or throttle butterfly angle $\alpha_{DK}$. In this, it is assumed that the braking wish or the drive wish corresponds to that for undisturbed straight-line travel at a high coefficient of friction.

$$F_{L,W} = f(P_{vor}, \alpha_{DK})$$

The total force desired by the driver can therefore be calculated as a vector sum.

$$F_{ges,W} = \sqrt{F_{S,W}^2 + F_{L,W}^2}$$

This desired force is now placed in a relationship with the maximum available force.

First Possibility

The resultant tire forces $Fr_i$ at the individual wheels are known (for example, in accordance with DE 40 30 704-A1) which corresponds to U.S. Ser. No. 07/859,438. The maximum available total force can then be estimated from the sum of all the tire forces. It is achieved when all the force directions are parallel.

$$F_{ges} = \sum_i |Fr_i|$$

Second Possibility

The total longitudinal force $F_L$ and the total transverse force $F_Q$ which act on the vehicle by means of the tires are known, for example, from knowledge of the longitudinal and transverse accelerations and vehicle mass. The total force can then be calculated as follows:

$$F_{ges} = \sqrt{F_L^2 + F_Q^2}$$

The ratio of the available total force to the desired total force is, therefore:

$$x = \frac{F_{ges}}{F_{ges,W}}$$

The ratio x is less than or equal to one.

$$x \overset{!}{\leq} 1$$

The required value $\omega_{soll}$ for the yaw rate is then given by the steady state required yaw rate $\omega_{soll0}$ multiplied by the factor x.

$$\omega_{soll} = x \cdot \omega_{soll10}$$

This means that if the yaw motion desired by the driver does not exceed the available total force, this required yaw rate is then accepted as the required value for the vehicle motion dynamics control system.

If, however, the available force $F_{ges}$ is not sufficient to achieve the desired change in motion simultaneously in the longitudinal and transverse directions, the required yaw rate $\omega_{soll}$ is then correspondingly reduced by the factor x. Should that not occur, the vehicle could start to skid as a consequence of continually increasing sideslip angle.

If, although the desired side force has to be reduced, it is relatively small in comparison with the desired longitudinal force, a reduction which takes place linearly with the factor x can lead to poor vehicle controllability. It is then better to take greater account of the desired side force, i.e. to raise the factor x.

The method described up to now for calculating the required value is particularly suitable where the tires are at saturation point, i.e., for example, in the case of full braking actions (ABS braking actions).

A further possibility for fixing the required yaw rate value, particularly where there is no wish for deceleration present, is to limit the raw steady state value $\omega_{soll10}$ to a value which depends on the instantaneous vehicle transverse acceleration. For this purpose, a required value limitation $\omega_B$ is calculated $$\omega_B = a_Q/v_F$$

with the transverse acceleration $a_Q$. $\omega_B$ is the value for the yaw rate at which, in the case of travel around a curve at constant vehicle velocity, the value of the sideslip angle is constant and, therefore, the vehicle remains stable.

In the case of a reduction in steering angles, the yaw rate $\omega$ does not take place in phase with the steering angle due to the vehicle's intrinsic dynamics of motion but with a certain delay. In order to avoid unnecessary intervention by the vehicle motion dynamics control system in such and similar situations (slalom), phase matching between the actual value $\omega$ and the required value $\omega_{soll}$ can be achieved by suitable low-pass filtering of the required yaw rate value. The filter parameters can depend on the vehicle condition, possibly supported by a model.

One example in discrete time embodiment is presented below:

$$\omega_{soll,f}(k) = F\,\omega_{soll}(k) + (1-F)\,\omega_{soll,f}(k-1)$$

where $\omega_{soll,f}(k)$ is the filtered value at time k with filter coefficient $0 < F < 1$ It is, however, also possible to match the vehicle's intrinsic dynamics of motion, which may be unsatisfactory, to a desired behavior by means of such filtering. This is done by the vehicle motion dynamics control system appropriately changing the yaw rate by means of appropriate actions at the wheels.

In some situations, particularly in the case of an increase in the steering angle, it can be desirable to make the vehicle reaction as rapid as possible and, furthermore, to increase the yaw rate $\omega$ above the steady-state required value $\omega_{soll10}$ in order to achieve a certain vehicle incidence (float angle). This increase $\omega_{Anstell}$ in the float angle is necessary in order to set to the slip angle at the tires which is necessary for the desired side force. This can be achieved by feeding the required yaw rate $\omega_{soll}$ through a differentiating filter (DT filter) in the case of an increase in steering angle and by adding the output from this filter, with suitable amplification, to the original required value.

Example (discrete time):

$$\omega_{soll,mod}(k) = \omega_{soll}(k) + \omega_{Anstell}(k)$$

where $$\omega_{Anstell}^k = V^*(\omega_{Anstell}^{k-1} + \omega_{soll}^k - \omega_{soll}^{k-1})$$

with weighting factor V<1

DESCRIPTION OF FIGURE

An embodiment example of the invention is represented in the form of a block circuit diagram in the drawing. Realization by means of a correspondingly programmed microprocessor is also, of course, possible.

DETAILED DESCRIPTION OF THE PREFERRED EMBODIMENT

Figure 1:
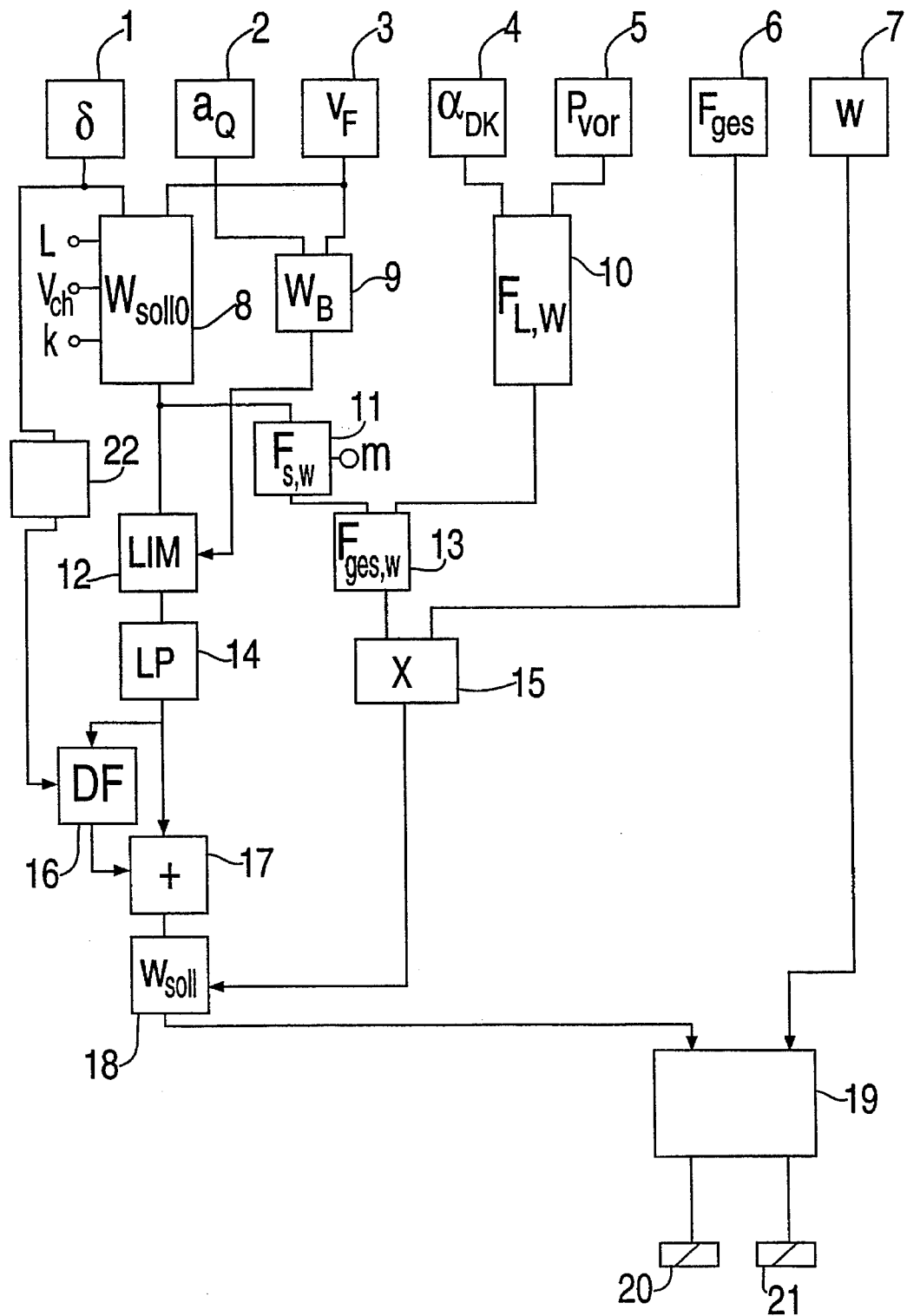

The signals from a steering angle sensor 1 and a vehicle velocity simulator 3 are supplied to a block 8 for forming $\omega_{soll10}$. The constants L, $V_{ch}$ and K are also supplied to this block 8. The $\omega_{soll10}$ signal is then supplied to a limiter 12 which limits the $\omega_{soll10}$ signal to the limiting value $\omega_B = a_Q/v_F$ formed (from Blocks 2 and 3) in a block 9. The output signal from Block 12 then passes to a low-pass filter 14 for the purpose of phase matching. Its output signal normally passes to a block 18 in which $\omega_{soll}$ is formed. If, however, the magnitude of the steering angle increases, which is determined in a block 22 (ds/dt>0), a differentiating filter 16 becomes effective and this forms an increase signal $\omega_{Anstell}$ which is superimposed on the $\omega_{soll10}$ value in an adding stage 17. The factor x is required for forming $\omega_{soll}$. In order to form it, the desired longitudinal force $F_{L,W}$ is formed in a block 10 as a function of throttle $\alpha_{DR}$ or brake pressure $P_{vor}$, the desired side force $F_{S,W}$ is formed in a block 11 from $\omega_{soll10}$, and the desired total force $F_{ges,W}$ is formed in a block 13 from the forces $F_{S,W}$ and $F_{L,W}$. The actual total force $F_{ges}$ is determined in a known manner in a block 6. From the forces $F_{ges}$ and $F_{ges,W}$, their ratio x is then formed in a block 15 and $\omega_{soll10}$ is multiplied by the ratio x in the multiplier 18. The required yaw rate value $\omega_{soll}$ obtained and the actual yaw rate value $\omega$ measured in a sensor 7 are supplied to a controller 19 which activates the brake pressure control valves 20 and 21 (only one wheel shown) in the sense of generating an additional yaw moment, in order to match the actual value $\omega_{soll}$ to the required value.

We claim:

1. Method for controlling stability of a vehicle exhibiting a steering angle $\delta$, a yaw rate $\omega$, a vehicle velocity $v_F$, a throttle butterfly position, and a master cylinder pressure $P_{vor}$, said method comprising determining the steering angle $\delta$, the yaw rate $\omega$, and the vehicle velocity $v_F$, determining a steady-state required yaw rate $\omega_{soll10}$ according to $$\omega_{soll10} = k\frac{v_F \delta}{L(1 + v_F^2/v_{ch}^2)}$$

where k is a constant, L is the wheel base, and $v_{ch}$ is a vehicle characteristic velocity, determining at least one of throttle butterfly position $\alpha_{DK}$ and master cylinder pressure $P_{vor}$, determining a desired longitudinal force $F_{L,W}$ as a function of at least one of $\alpha_{DK}$ and $P_{vor}$, determining a desired side force according to $F_{S,W} = mv_F \omega_{soll0}$ where m is the vehicle mass, determining the total force desired by the driver according to $$F_{ges,W} = \sqrt{F_{S,W}^2 + F_{L,W}^2},$$

determining the total available force $F_{ges}$ between tires and road, determining a factor $x = F_{ges}/F_{ges,W}$, where $x \leq 1$, determining a required yaw rate $\omega_{soll}$ according to $\omega_{soll} = x\omega_{soll0}$, and varying brake pressure at the wheels so that $\omega = \omega_{soll}$.

2. Method as in claim 1 wherein $F_{ges}$ is determined by determining and adding tire forces at the individual wheels.

3. Method as in claim 1 wherein $F_{ges}$ is determined by determining the total longitudinal force $F_L$ and the total transverse force $F_Q$, and by the relation $F_{ges} = F_L^2 + F_Q^2$.

4. Method as in claim 3 wherein $F_L$ and $F_Q$ are determined by determining the total longitudinal acceleration $a_L$ and the total transverse acceleration $a_Q$, and by the relations $F_L = ma_L$ and $F_Q = ma_Q$, where m is the vehicle mass.

5. Method as in claim 1 wherein $\omega_{soll}$ is reduced when the available forces are not sufficient for the desired change in motion.

6. Method as in claim 5 wherein the factor x increases when $F_{S,W}$ decreases and the ratio $F_Q/F_L$ falls below a specified value.

7. Method as in claim 1 wherein a transverse vehicle acceleration $a_Q$ is determined and $\omega_{soll0}$ is limited to $\omega_B$, where $\omega_B = a_Q/v_F$.

8. Method as in claim 1 wherein $\omega_{soll}$ is subjected to low pass filtering so that $\omega$ and $\omega_{soll}$ are phase matched.

9. Method as in claim 1 further comprising determining when the steering angle $\delta$ is increasing, feeding the signal $\omega_{soll}$ through a differentiating filter to produce an increase signal $\omega_{Ansell}$, forming a filtered value $\omega_{soll,mod}$ according to $\omega_{soll,mod} = \omega_{soll} + \omega_{Ansell}$, and substituting $\omega_{soll,mod}$ for $\omega_{soll}$ in order to vary the brake pressure.

\* \* \* \* \*